Patented July 21, 1925.

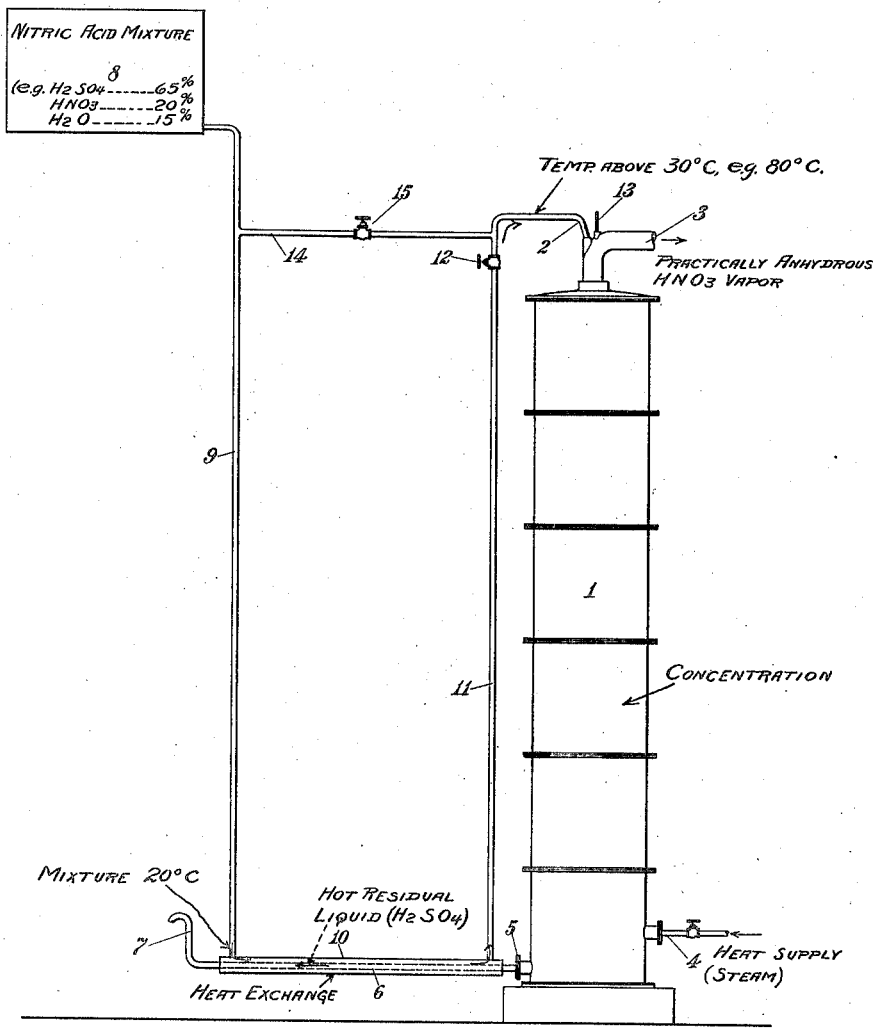

1,546,910

UNITED STATES PATENT OFFICE.

FRED C. ZEISBERG, OF WILMINGTON, DELAWARE, ASSIGNOR TO E. I. DU PONT DE NEMOURS & COMPANY, OF WILMINGTON, DELAWARE, A CORPORATION OF DELAWARE.

PROCESS OF CONCENTRATING NITRIC ACID.

Application filed May 29, 1922. Serial No. 564,313.

*To all whom it may concern:*

Be it known that I, FRED C. ZEISBERG, a citizen of the United States, and a resident of Wilmington, in the county of New Castle and State of Delaware, have invented a certain new and useful Process of Concentrating Nitric Acid, of which the following is a specification.

This invention relates to the concentration of nitric acid and particularly to that form of continuous process for concentrating nitric acid known as the "tower process", of which the process described in U. S. Pat. 1,292,948 is a well known example. My invention is applicable also in the denitration of certain kinds of waste acid which on denitration in the apparatus of the above mentioned patent yield strong nitric acid, for example, the waste acid from the nitration of "pyro" nitro-cellulose.

The object of my invention is to economize on the amount of steam normally used in such a tower process, and to increase the capacity of the apparatus used.

In the prior process as normally carried out, a mixture of nitric acid, surfuric acid and water is led into the top of the tower while live steam is blown into the bottom of the tower. The steam rises through the tower countercurrent to the down-flowing acid mixture, gradually condensing and gradually vaporizing the $HNO_3$. If the proportions of the tower are properly chosen, and the composition of the mixture is correct, while at the same time the rate of addition of acid mixture and steam are properly adjusted, a practically anhydrous nitric acid vapor distills from the top of the tower while $HNO_3$—free sulfuric acid, diluted with all of the condensed steam, runs out of the bottom. This has all been set forth in U. S. Patent 1,292,948.

It is necessary, for the proper functioning of the tower as a fractionating column, that the acid mixture be brought to the boiling point and maintained at its boiling point throughout its descent through the column. The only source of heat to accomplish this is the live steam blown into the tower. It is evident, therefore, that the higher the temperature of the incoming feed acid, the smaller must be the amount of steam used to bring this acid to the boiling point. I have discovered that this reasoning is correct, and that by heating the feed acid a corresponding decrease in the steam consumption can be brought about. Thus, where, with a feed acid containing 65% $H_2SO_4$, 20% $HNO_3$ and 15% water, and the apparatus described in U. S. Patent 1,292,948, it is necessary to use 0.725 pound steam per pound $HNO_3$ distilled, to effect complete separation of the $HNO_3$ from the $H_2SO_4$ and the water when the original mixture has a temperature of 20° C., only 0.485 pound steam is required when the original mixture is at 80° C. Heating the feed to a higher temperature reduces the steam consumption proportionally, but at the same time increases the height of the tower necessary to effect complete separation. Thus, with the feed entering at the boiling point (about 118° C. for the above mixture) the tower would have to be of infinite height if there were no radiation loss from it, in order to effect separation. Practically, because of this radiation loss, which brings about condensation of steam and hence modification of the composition of the entering acid, a very high tower could effect the necessary separation when the feed acid enters boiling, but the tower would be too high to use in practice. I have found 80° C. to be a good, practical compromise for the temperature of the feed acid, it being unnecessary to add to the height of a tower (24 feet) used under present operating conditions when going to this feed temperature.

The saving brought about by heating the feed is thus 0.725—0.485=0.24 pound steam per pound $HNO_3$ distilled. Not only is the steam saved in the first place, but if the residual sulfuric acid from this process is subsequently to be reconcentrated for further use, as is nearly always the case, it is unnecessary to evaporate this 0.24 pound of condensed steam from it, a further saving of fuel in the sulfuric acid concentrating operation. Furthermore the capacity of the tower is increased in practically direct proportion to the steam saving; in the above case about 50%.

The source of heat which I use in raising the temperature of the feed acid is the boiling residual acid from the bottom of the tower, whose heat content is generally wasted. In the example cited this acid has a temperature of about 160° C. By putting the feed acid through an apparatus in heat exchanging relationship with the outflowing, hot residual acid, for example a double pipe heat exchanger of lead, the feed can easily be brought to any desired temperature, a valved by-pass around the heat exchanger permitting the temperature to be maintained at any desired figure even with considerable variation in the original temperature of the feed acid.

Of course, if waste steam, or any other source of waste heat is available, the feed acid may be heated with it, instead of with the outflowing residual acid, without departing from the spirit of my invention.

A suitable form of apparatus for carrying out the process above described is shown diagrammatically in the accompanying drawing, which is a view in side elevation. The apparatus comprises a tower 1 having at the top an inlet 2 for acid and an outlet 3 for vapors, and near the bottom an inlet 4 for steam and an outlet 5 for residual acid. An inner pipe 6 of a heat exchanger is connected at one end with the outlet 5 and at the other end with a trap 7. A feed acid storage tank 8 is connected by pipe 9 with the outer jacket 10 of the heat exchanger, which is connected in turn by pipe 11 with the inlet 2, the flow of liquid through this series of pipes being controlled by a valve 12. A by-pass pipe 14, with control valve 15, connects the pipes 9 and 11 whereby, by closing the valve 12 and opening the valve 15 the acid from the tank 8 may be run directly to the tower if desired. Provision is made in the outlet pipe 3 for a thermometer 13 which is used in adjusting the ratio between the acid feed and the steam supply.

In operation, the waste acid is fed continuously from the storage tank 8 through the heat exchanger 10, where it is heated substantially above 30° C. and is preferably heated to about 80° C., into the top of the tower 1. Steam is supplied through the inlet 4 at such a rate as to cause practically anhydrous nitric acid vapor to distil from the top of the tower. The residual acid which flows continuously from the bottom of the tower through the pipe 6 of the heat exchanger serves to bring the feed acid to the proper temperature.

Having now described my invention in detail, from which detail I wish it understood that considerable variation may be made, such as changes in the composition of the acid used, temperature to which it is heated, etc., without departing from the spirit of my invention:

I claim:

1. In the continuous process of concentrating nitric acid or denitrating waste acid containing nitric and sulfuric acids by passing the acid mixture downwardly through a tower while heating it, the step which comprises heating said acid mixture substantially above 30° C. but below its boiling point before introducing it into the tower.

2. In the continuous process of concentrating nitric acid or denitrating waste acid containing nitric and sulfuric acids by passing the acid mixture downwardly through a tower while heating it, the step which comprises heating said acid mixture to a temperature of about 80° C. before introducing it into the tower.

3. The process of recovering concentrated nitric acid from a nitric acid mixture which comprises heating said acid mixture to a temperature above 30° C. but substantially below its boiling point, introducing said heated acid into the top of a tower, allowing said heated acid to flow down through said tower, introducing sufficient steam into the acid near the bottom of the tower to maintain the acid mixture at the top of the tower at about its boiling point, and withdrawing vapors of concentrated nitric acid from the top of the tower.

4. In the continuous process of concentrating nitric acid or denitrating waste acid containing nitric acid and sulfuric acids by passing the acid mixture downwardly through a tower while heating it, the step which comprises bringing said acid mixture into heat-exchanging relation with the hot residual acid which has issued from the bottom of the tower until the mixture has reached a temperature substantially above 30° C. but below its boiling point before feeding said acid mixture to the tower.

5. In the continuous process of concentrating nitric acid or denitrating waste acid containing nitric and sulfuric acids by passing the acid mixture downwardly through a tower while heating it, the step which comprises bringing said acid mixture into heat-exchanging relation with the hot residual acid which has issued from the bottom of the tower until said acid mixture has reached a temperature of about 80° C. before feeding said acid mixture to the tower.

6. The process of recovering concentrated nitric acid from a nitric acid mixture which comprises heating said acid mixture to a temperature substantially below its boiling point by bringing it into heat-exchanging relation with hot residual acid, feeding said heated acid mixture to a tower, allowing said heated acid to flow down through said tower, introducing sufficient steam into the acid near the bottom of the tower to maintain the acid mixture at the top of the tower at about its boiling point, withdrawing vapors of concentrated nitric acid from the top of the tower, and passing hot residual acid from the bottom of the tower into heat-exchanging relation with fresh acid mixture to preheat the latter.

In testimony whereof I affix my signature.

FRED C. ZEISBERG.